Jan. 9, 1945.  L. A. MARTINE-LALLY ET AL  2,367,039
STUD PAD
Filed Feb. 15, 1944
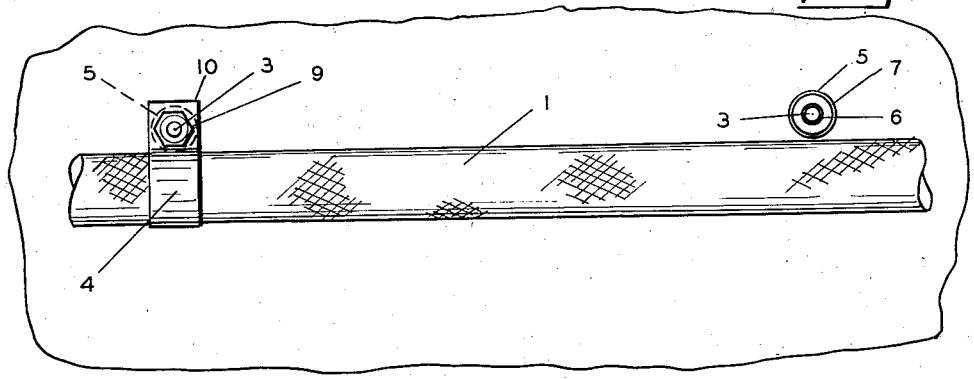
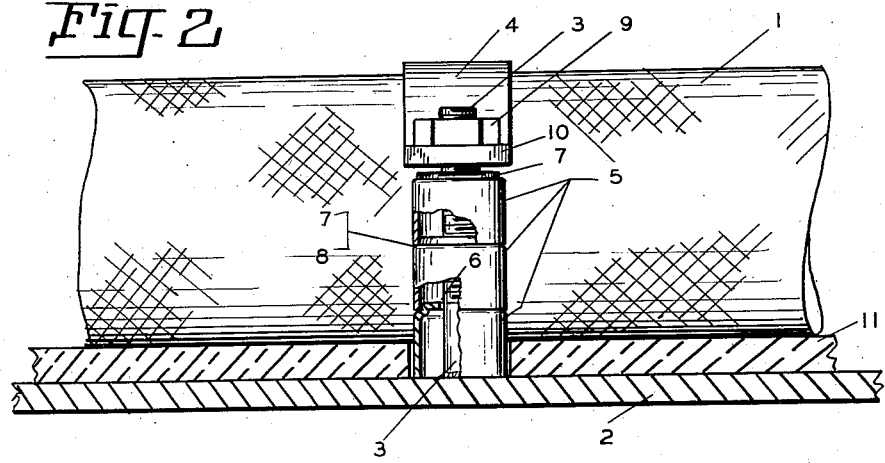
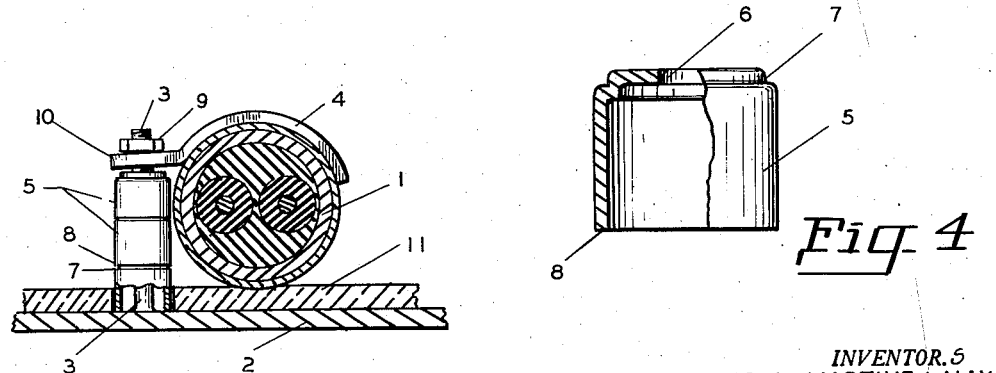
INVENTOR.S
LUIS A. MARTINE-LALLY
WILLIAM A. DONEY
JOSEPH C. DITTO
BY
G. F. McDougall
Attorney.

Patented Jan. 9, 1945

2,367,039

UNITED STATES PATENT OFFICE 2,367,039

STUD PAD

Luis A. Martine-Lally, William A. Doney, and Joseph C. Ditto, Portland, Oreg., ass'gnors, by direct and mesne assignments, to Production Engineering Co., a copartnership of Oregon Application February 15, 1944, Serial No. 522,526

1 Claim. (Cl. 248—74)

This invention relates to what is known in the art as a stud pad.

In mounting runs of electric cable within the interior of ships for mounting pipework and such like, it is necessary to keep the cables out of the way of cargo, to follow asymmetrical bulkhead or other surfaces at times, and to so mount the cables or other appliances that cargo shifting in a hold will be unlikely to damage it; and that it will resist heavy vibration, the concussions of gunfire and even the shock of a projectile fired by enemy action, provided it is not directly hit.

It is the object of this invention to contribute importantly to a construction that will meet the foregoing outlined conditions and also be of low cost, wide availability and so formed that it will easily go in place the right way and at the same time be impossible to install it wrongly without that fact being instantly apparent to an unskilled person.

Describing electrical cables, considerable numbers of which will be found in varying sizes in steamships: A two-wire cable, carrying a pair of number 12 conductors consists essentially of a three-quarter inch O. D. lead pipe or sheath, wrapped in asphalted fabric, outside of which is a woven steel armor. Inside the cable are the two wires, rubber covered, and the remaining space is packed hard with insulating material. Larger cables are proportionately larger and heavier. These cables are run along the inside elements of a ship, bulkheads and the like, sometimes singly, and at other times there will be a plurality of cables side by side.

To define the cable run, a line of steel studs having one plain and one threaded end are welded electrically by their plain ends to the steel of the ship, being usually a quarter or five-sixteenths of an inch in diameter to form the basic anchorage of the cable to the steel plates of the ship.

It will be appreciated at once that the larger, heavier cables apply their loads and shock loads to these studs at points further from their welded bases than do the smaller, lighter cables, which is the exact opposite of what is desired. The problem, then, is to provide clamp clips and stud pads easily, quickly and accurately applicable that will so support and strengthen the studs that aside from differences in lineal spacing of the studs and clamps to engage one or more cables, the balance of the construction can be uniform, thus greatly reducing both material and labor costs.

We have solved these problems by the construction shown in the accompanying drawing, in which, Fig. 1 is a plan view of a run of cable showing one complete anchorage structure at the left hand side of the figure and the top of a stud with the stud pad thereon, to be more completely described hereinafter;

Fig. 2 is a side view of a cable mounting such as that at the left hand of Fig. 1, at enlarged scale and including three stud pads partly broken away to show the relationship between the stud and the pads;

Fig. 3 is a right hand end view of Fig. 2 reduced in scale to utilize the space available for it; and Fig. 4 is an elevation of a stud pad partly sectioned to show its construction.

Describing the drawing more in detail, 1 is a conductor sheath which will contain one or more conductors as shown in Fig. 3, which may rest upon a pad 11 laid on the structural member 2 such as the steel of a deck or bulkhead inside of a ship, to which is welded a stud 3 as shown in Figs. 2 and 3.

At its unwelded end, the stud will be threaded and provided with a nut as shown and its purpose as clearly illustrated is to support a conductor such as 1 in all directions that stress may occur, by virtue of the clamp 4, unitary with which is the ear portion 10 that engages with the stud 3.

It is at once apparent that a slender stud will have little holding power without the stud pad 8 or an assemblage of them as shown in Figs. 2 and 3. It is also apparent that where the assemblage is used such as shown in Figs. 2 and 3 that a very much greater lateral strength is added by the use of the stud pads 8, involving an almost inconsequential increase in the weight of metal employed.

It will also be observed that by making these stud pads of uniform height and of deep drawn, unitary, ferrous metal of the form shown in Fig. 4, that a stud such as 3 will be sufficient to hold numerous sizes of cables, conductors or pipes and will accomplish the work with equal rigidity with several superposed stud pads.

The virtue of these stud pads resides in the fact that they have cylindrical skirt portions 5 and tenon portions 7 of the same outside diameters as the inside diameters of the opposite ends of the pads, and the pads therefore are stackable rigidly when one pad is superposed on another in any order.

This rigidity is greatly increased by the annular part 6 that will be made as a sliding fit over the stud 3; and when the nut 9 is screwed home on the stud 3 of an assemblage of stud pads, the eye portion 10 of the clamp 4 being in the assemblage, an exceedingly rigid anchorage is provided for a cable such as 1 by use of a relatively small amount of metal. It makes an inexpensive, widely available and easily duplicated conductor support, the annular top portions 6 on the pads serving as so many diaphragms to distribute the load of any stress such as caused by buckling of the plates, concussion of gun fire or any of the stresses that may be encountered in steel ships. The annular diaphragm-like top portions 6 make it possible for the stud pads to cock under any stress short of a destructive one.

Having fully described our invention, what we claim as new and desire to secure by Letters Patent, is:

A stud pad for employment in anchoring a cable or the like to a ship's plate by a plurality of studs and clamps, comprising a skirt portion having one full sized open end, the other end being shouldered and reduced in diameter beyond the shoulder to the form of a tenon tightly fitting the open end of another pad stackable in rigid linear engagement with the open end of a superposed pad, the unitary tenon portion provided with a central hole.

LUIS A. MARTINE-LALLY.
WILLIAM A. DONEY.
JOSEPH C. DITTO.